United States Patent [19]
Jongerius et al.

[11] Patent Number: 5,692,085
[45] Date of Patent: Nov. 25, 1997

[54] METHOD OF ASSEMBLING A RADIATION SOURCE UNIT FOR SUPPLYING SHORT-WAVE OPTICAL RADIATION

[75] Inventors: Michiel J. Jongerius; Ronald R. Drenten, both of Eindhoven, Netherlands

[73] Assignee: U.S. Philips Corporation, New York, N.Y.

[21] Appl. No.: 515,311

[22] Filed: Aug. 15, 1995

[30]       Foreign Application Priority Data

Aug. 23, 1994   [EP]   European Pat. Off. .............. 94202406

[51] Int. Cl.$^6$ ...................................................... G02B 6/42
[52] U.S. Cl. ................... 385/91; 385/90; 385/93
[58] Field of Search ............................ 372/93, 21, 22, 372/108; 359/326–332; 385/88, 90–94

[56]            References Cited

U.S. PATENT DOCUMENTS

| | | | |
|---|---|---|---|
| 4,355,323 | 10/1982 | Kock | 257/680 |
| 5,036,220 | 7/1991 | Byer et al. | 359/328 |
| 5,049,762 | 9/1991 | Katoh | 359/332 |
| 5,107,537 | 4/1992 | Schriks et al. | 385/91 |
| 5,175,784 | 12/1992 | Enomoto et al. | 359/332 X |
| 5,347,604 | 9/1994 | Go et al. | 385/92 |

FOREIGN PATENT DOCUMENTS 0432390   6/1991   European Pat. Off. .

OTHER PUBLICATIONS

"Het systeem Compact Disc Digital Audio" by M.G. Carasso et al. in Philips Tecnisch Tijdschrift 40, 267–272, 1981/82, No. 9 (no month given).

Primary Examiner—John D. Lee
Attorney, Agent, or Firm—Leroy Eason

[57]               ABSTRACT

The invention relates to a radiation source unit for supplying shortwave optical radiation, and to a method of assembling such a unit. The radiation source unit comprises a diode laser and a waveguide of a non-linear optical material for converting the diode laser radiation into radiation having a smaller wavelength. The diode laser is provided in a bush having a first end and a second, open end. The second end is adapted to accommodate a first holder in which a lens system is arranged for imaging the exit plane of the diode laser on the entrance plane of the waveguide. At a side of the first holder remote from the diode laser a second holder is secured in which the waveguide is arranged. Said holders are aligned and fixed with respect to each other in such a way that the chief ray of the diode laser beam, the optical axis of the lens system and the axis of the waveguide are in alignment, and that the diode laser beam is focused on the entrance aperture of the waveguide.

2 Claims, 2 Drawing Sheets

METHOD OF ASSEMBLING A RADIATION SOURCE UNIT FOR SUPPLYING SHORT-WAVE OPTICAL RADIATION

BACKGROUND OF THE INVENTION

1. Field of the Invention

The invention relates to a radiation source unit for supplying short-wave optical radiation, which unit comprises a diode laser and a waveguide of a non-linear optical material for converting the diode laser radiation into radiation having a smaller wavelength, the diode laser and the waveguide being accommodated in a housing.

The invention also relates to a method of assembling such a radiation source unit.

The invention further relates to a device for optically scanning an information plane, which device comprises such a radiation source unit.

2. Discussion of the Related Art

A radiation source unit of the type described in the opening paragraph is known from European Patent Application EP 0 432 390.

Radiation source units supplying short-wave optical radiation are used, inter alia in devices for optically reading and/or writing optical record carriers such as, for example CD audio, CD-ROM, CD-I etc., or magneto-optical record carriers. In such record carrier systems the aim is to increase the information density so that more information can be stored in the record carrier of the same size. To this end, the information areas must be smaller. This object can be achieved by reducing the radiation spot used for reading and writing, because the size of the radiation spot is proportional to the wavelength λ of the radiation used. For example, by halving the wavelength of the radiation beam, the size of the scanning spot on the record carrier is also halved and the information density on this record carrier can be increased, for example by a factor of four. Such a wavelength halving, or in other words frequency doubling, can be realised by combining a conventional diode laser, which emits radiation at a wavelength of, for example the order of 800 nm, with a second harmonic generator, in which frequency doubling takes place, in the form of a non-linear optical crystal or a waveguide of a non-linear optical material. In this way, the infrared radiation is converted into blue radiation having a wavelength of the order of 400 nm.

To obtain a sufficiently high output of blue light, sufficient radiation from the diode laser should be coupled into the second harmonic generator. Particularly in the case where the second harmonic generator is a waveguide, the coupling should be effected accurately, because the waveguide is substantially monomode and thus has a small cross-section and generally a rather small entrance aperture. A monomode waveguide is to be preferred in this case because only the diode laser radiation coupled in the fundamental mode, i.e. the pump radiation, effectively takes part in the frequency-doubling process.

Said European Patent Application therefore particularly pays attention to the thickness of the waveguide and to a technique of manufacturing such a waveguide. During assembly, the diode laser is mounted on a cooling block and the waveguide is mounted on an assembly substrate and coupled together by means of a butt coupling.

Since the distance between the diode laser and the waveguide should be of the order of 0.5 μm maximum, because the divergence of the laser beam is too large at a larger distance from the diode laser, and since too much light will not be coupled into the waveguide when it is placed at this larger distance, the diode laser and the waveguide should be aligned very accurately with respect to each other.

A drawback of the known radiation source unit is that in the alignment of the active layer of the diode laser with respect to the waveguide the available number of degrees of freedom is relatively limited. As from the assembly of the diode laser on the cooling block and the waveguide on the assembly substrate, only the block and the substrate may be moved with respect to each other. However, since displacements of several tenths of microns are concerned in this case, one should be very careful that the diode laser and the waveguide do not touch each other so as to prevent damage. Such an alignment is thus relatively difficult and cumbersome.

Moreover, the shape of the radiation field of the diode laser should correspond as much as possible to the shape of the waveguide so as to have an optimum coupling efficiency. In the known radiation source unit, no measures are taken to achieve this, but the radiation from the diode laser is directly incident on the waveguide. Therefore, the coupling efficiency will not be optimal.

An improvement of the coupling efficiency from 35% to 40% of the radiation supplied by the diode laser already yields a frequency-doubled radiation output which is twice as high.

The radiation source unit described in said Patent Application and other radiation source units having frequency-increasing elements known from literature have only been described in a principal sense and are shown diagrammatically, while no particulars are stated about the mechanical constructions of the unit and the requirements to be imposed.

The most important requirements are that the waveguide and the diode laser should be and remain aligned with respect to each other in such a way that the mutual distance between the diode laser and the waveguide is and remains such that a maximum quantity of radiation of the diverging diode laser beam enters the waveguide and is doubled in frequency.

SUMMARY OF THE INVENTION

The present invention provides a radiation source unit construction with which these requirements can be satisfied and which can be assembled in a relatively simple manner.

To this end, the radiation source unit according to the invention is characterized in that the housing comprises a cylindrical bushing (or "bush"), at a first end of which the diode laser is arranged and a second end of which is open and adapted to accommodate a first holder in which a lens system is arranged for imaging the exit plane of the diode laser on the entrance plane of the waveguide, and in that at a side of the first holder remote from the diode laser a further, second holder is secured in which the waveguide is arranged, said holders being aligned and fixed with respect to each other in such a way that the chief ray of the diode laser beam, the optical axis of the lens system and the axis of the waveguide are in alignment, and in that the diode laser beam is focused on the entrance aperture of the waveguide.

It is to be noted that a radiation source unit for supplying short-wave optical radiation, in which a lens system is arranged between the diode laser and the waveguide, is known, for example from U.S. Pat. No. 5,036,220. However, this Patent does not describe any measures for an optimum alignment of the different parts.

The invention makes novel and inventive use of the knowledge gained by the Applicant in the field of optical telecommunication for coupling in long-wave diode laser radiation at a wavelength of 1300–1500 nm, as described in, for example U.S. Pat. No. 4,355,323, and is based on the recognition that this knowledge is applicable in the technical field of short-wave radiation source units, primarily intended for optical information storage systems.

The lens system focuses the diverging diode laser beam on the entrance aperture of the waveguide. The numerical aperture of the lens system is preferably chosen to be such that substantially all diode laser radiation is received by the lens. In order that the radiation spot formed by the lens system should coincide with the entrance aperture of the waveguide, the diode laser, the lens system and the waveguide are aligned and fixed correctly with respect to each other so that this alignment is also maintained after assembly. Moreover, the diode laser beam is focused on the entrance aperture, which remains like this due to fixation after assembly. To this end, the mutual distances between diode laser, lens system and waveguide should be set correctly.

An additional advantage of the embodiment described is that the holders rather than the components accommodated therein, viz. the lens system and the waveguide, are mechanically loaded during alignment, so that there is a relatively small risk of damage of the lens system and the waveguide.

An embodiment of the radiation source unit according to the invention is characterized in that the non-linear optical material is one of the materials KTP, $LiNbO_3$ or $LiTaO_3$.

KTP ($KTiOPO_4$), $LiNbO_3$ and $LiTaO_3$ are particularly suitable as frequency-doubling materials in the form of a waveguide. They are materials in which waveguides can be implemented in such a way that phase matching is realised right away.

A further embodiment of the radiation source unit according to the invention is characterized in that, of the bush and the first holder the part having the largest diameter is circumferentially provided with a plurality of apertures at its end which is in contact with the other part, said apertures being provided at a substantially equal height and at a given distance from each other for fixing the two parts together.

Dependent on whether the diameter of the bush is smaller or larger than the diameter of the first holder, the apertures may be provided in the wall of the first holder or in the wall of the bush. In this way, the bush with the diode laser and the holder with the lens system can be attached to each other in a relatively simple manner by providing glue in the apertures:

The embodiment in which the diameter of the bush is larger than the diameter of the first holder is preferred because the latter component and the diode laser are retained during alignment.

This embodiment of the radiation source unit according to the invention is preferably characterized in that the apertures are at an angular distance of 120° from each other.

Three fixation points at an angular distance of 120° are sufficient for a satisfactory attachment, while the number of fixation points is not too large.

The invention further relates to a method of assembling a radiation source unit. This method is characterized in that consecutively —a diode laser is secured to a first end of a bush and
—a first holder comprising a lens system is arranged at a second, open end of said bush,
—a second holder comprising a waveguide of a non-linear optical material is arranged at the side of the first holder remote from the diode laser,
—when the diode laser is switched on, the first holder is moved by means of the second holder parallel to the direction of propagation of the diode laser radiation for focusing said radiation on the entrance plane of the waveguide,
—the second holder is moved in two mutually perpendicular directions perpendicular to this direction of propagation for optimally positioning the radiation spot formed by the lens system in the entrance aperture of the waveguide,
—the bush and the first holder are then fixed together,
—the second holder is moved a second time in the two mutually perpendicular directions for definitively positioning the radiation spot in the entrance aperture, and
—the second holder and the first holder are fixed together.

This method comprises a number of relatively simple steps, so that a radiation source unit supplying an optimal and stable power of short-wave optical radiation can be assembled in a relatively simple manner.

A further embodiment of the method according to the invention is characterized in that the assembly is performed in an assembly device having a power supply with which the diode laser is driven, and a detection system with which the quantity of generated, frequency-doubled radiation is measured.

A very suitable manner of obtaining an optimal alignment of the components is to control the alignment on the basis of the measured intensity of generated, frequency-doubled radiation.

These and other aspects of the invention will be apparent from and elucidated with reference to the embodiments described hereinafter.

DETAILED DESCRIPTION OF THE PREFERRED EMBODIMENTS

Figure 1:
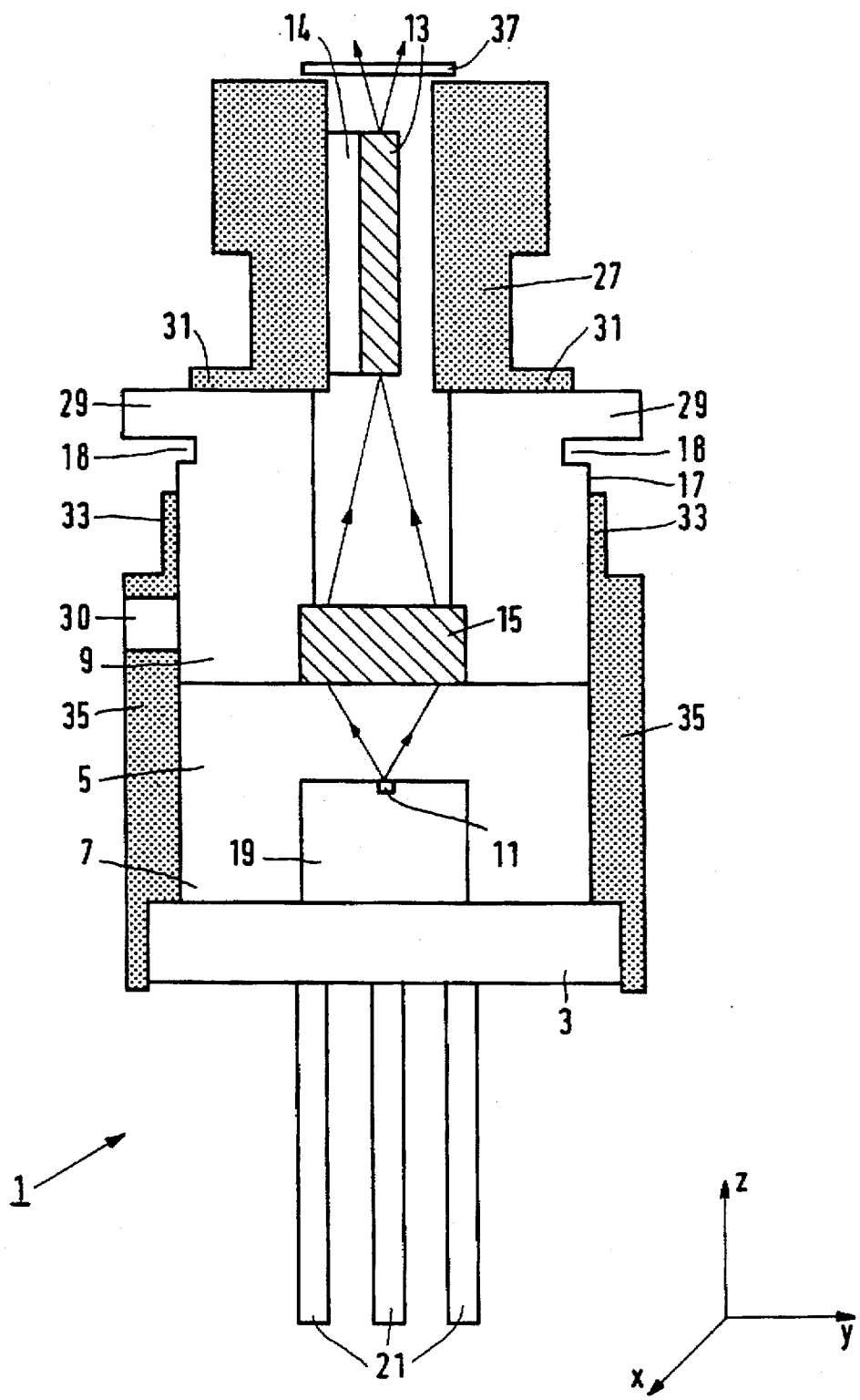
FIG. 1 is a diagrammatic representation of an embodiment of a radiation source unit according to the invention.

The radiation source unit 1 shown in FIG. 1 comprises a support 3 on which a bush 5 having a first end 7 and a second, open end 9 is arranged. A diode laser 11, whose radiation is to be doubled in frequency, is arranged on a cooling block 19 on the support 3 at the level of the first end 7 of the bush 5. To this end, use is made of a frequency-doubling element in the form of a waveguide 13 of a non-linear optical material. The diode laser 11 is, for example a high-power AlGaAs diode laser and the non-linear material is, for example KTP, $LiNbO_3$ or $LiTaO_3$. These materials are very suitable for frequency doubling. They are materials in which waveguides can be implemented in such a way that the phase matching, required for frequency doubling, between the fundamental radiation and the frequency-doubled radiation is realised right away. Since the frequency-doubled radiation propagates through the waveguide at a different speed than the fundamental radiation, and frequency conversion takes place at different positions in the longitudinal direction of the waveguide, the different waves of the higher harmonic radiation have different phases, which may give rise to extinction of the frequency-doubled radiation. This can be prevented by ensuring that the propagation speeds of the fundamental radiation and the frequency-doubled radiation are equal. This solution is known as phase matching. This may be realised, for example by providing a periodical domain structure in the waveguide, in which two successive domains have mutually inverted electrical polarizations, as described, for example in the afore-mentioned U.S. Pat. No. 5,036,220.

In order that a maximum possible conversion efficiency is achieved, the waveguide 13 should be substantially monomode at the wavelength of the diode laser and consequently has a small cross-section and a small entrance aperture. The radiation supplied by the diode laser 11 is therefore to be coupled into the waveguide 13 carefully. To this end, a lens system 15, with which the radiation supplied by the diode laser 11 can be focused on the entrance aperture of the waveguide 13, is arranged between the diode laser 11 and the waveguide 13. The present invention proposes to arrange the lens system 15 and the waveguide in separate holders 17 and 27, respectively, both of which can be displaced during assembly and subsequently fixed in their optimum position. The first holder 17 can be displaced in the z direction, i.e. the direction parallel to the direction of propagation of the diode laser beam in order to realise optimum focusing of the laser beam on the entrance plane of the waveguide. The displacement of the first holder 17 is realised by a corresponding displacement of the second holder 27. Moreover, the second holder 27 can be displaced in two mutually perpendicular directions x, y perpendicular to the direction of propagation of the radiation beam so that the laser beam can be exactly focused on the entrance aperture of the waveguide.

The bush 5 may be secured to the support 3, for example by means of a conventional welded joint. The diode laser 11 is secured to the support 3 via a cooling block 19 in a manner known from semiconductor manufacture. Moreover, three contact pins 21 are secured to the support 3, via which pins the diode laser 11 can be connected to a current source (not shown) and a possible monitor diode can be connected to a detection circuit (both not shown).

The different components are preferably positioned and aligned with respect to each other in a suitable assembly device with reference to intensity measurements of the generated, frequency-doubled radiation. The diode laser is activated by means of a power supply. The components are subsequently displaced with respect to each other in the manner as will be described hereinafter, until the maximum intensity value of the blue light is measured.

The possibility of displacing the holders 17, 27 and the bush 5 with respect to each other during assembly is realised in the following manner.

The second end 9 of the bush 5 is open and is adapted to accommodate the first holder 17. The diameter of the first holder 17 may be smaller or larger than the diameter of the bush 5 so that the holder 17 can be moved up and down within or outside the bush. In the embodiment shown in FIG. 1 the diameter of the bush is larger than the diameter of the first holder. This embodiment is preferred because, during alignment, the bush 5 with the diode laser 11 can be retained more easily. Subsequently, the second holder 27 accommodating the waveguide 13 on an assembly substrate 14 is arranged on the side of the first holder 17 remote from the diode laser 11. The two holders 17, 27 may be provided with, for example, a rim 29, 31 with which the two holders are placed against each other and which are wide enough to permit the two holders to be displaced with respect to each other in the plane in which the rims extend.

After the holder 27 has been placed on the holder 17 and the latter is arranged in the bush 5 and the diode laser 11 is switched on, the second holder 27 is first moved in the z direction so that the first holder 17 is urged towards the diode laser 11 so as to focus the diode laser radiation on the entrance plane of the waveguide 13. The dimension of the first holder 17 in the x direction is adapted to the magnification of the lens system used. Moreover, the numerical aperture of the lens system may be chosen to be such that substantially all radiation of the diode laser is captured and that the laser beam is imaged in its suitable shape on the entrance plane of the waveguide 13. The first holder 17 may be provided with recesses 18 and may be clamped by a clamping spring (not shown) during assembly, which clamping spring is secured to the fixed body, for example the assembly device used, so that the holder 17 is urged against the holder 27, and which ensures that the holder 17 springs back if it is moved too far towards the diode laser 11 by the second holder 27.

By displacing the first holder 17 with respect to the bush 5 in the z direction, the focusing of the diode laser beam on the entrance plane of the waveguide 13 can be optimized. The beam is directed onto the entrance aperture by displacing the second holder 27 in the x, y direction, i.e. in the plane perpendicular to the direction of propagation of the beam. When the optimum coupling is achieved by said z displacement and x, y displacement, the first holder 17 and the bush 5 are fixed together. This is the least critical part of the alignment.

Subsequently, the alignment of the beam from the diode laser 11 fixed to the lens system 15 is optimized with respect to the waveguide 13 for a second time by displacing the second holder 27 in the x, y direction. This is the most critical step of the alignment.

Since all components are aligned with respect to each other by manipulating only the second holder 27, the assembly of the radiation source unit according to the invention is relatively simple.

Fixation of the bush 5 to the first holder 17 and fixation of the first holder 17 to the second holder 27 may be realised, for example by means of known two-component glues.

To facilitate fixation of the bush 5 to the first holder 17, for example, the wall of the bush 5 or the wall of the first holder 17, dependent on whether the diameter of the bush 5 is larger or smaller than the diameter of the first holder 17, may be provided, at the level of their ends to be fixed together, with a plurality of apertures 30 arranged at an equal height and at a regular distance from each other. The fixing agent may be provided in these apertures. A suitable number of apertures is three, spaced apart at 120°. By choosing the suitable size for the apertures, the required quantity of fixing agent may be determined so that fixation can be performed smoothly.

The parts may alternatively be fixed together by means of laser welding. It is apparent from the Figure that the rims 29, 31 can be fixed together by means of laser welding. The same applies to fixing the thin-walled end 33 of the wall 35 to the wall 35 of the first holder 17.

Another method is to provide a plastic soldering layer of, for example indium between two parts to be fixed. The two parts are thereby displaceable with respect to each other, while the soldering layer is plastically deformed but the parts remain attached. When the suitable displacement has been achieved, the layer is soldered definitively. Such a plastic soldering layer is particularly suitable to be used for the adhesion between the first holder 17 and the second holder 27.

A numerical example is given to illustrate the operation of the radiation source unit. The lens system comprises, for example an aspherical lens having a numerical aperture of 0.3 with which the diode laser beam is focused on the entrance aperture of the waveguide. An optimum coupling efficiency of approximately 40% of the diode laser power for a laser having a far-field distribution of 10° by 30° is obtained at a lens magnification factor of approximately 2.

Finally, some examples of methods will be described in which the quantity of frequency-doubled radiation supplied by the radiation source unit can be optimized. A non-linear optical material generally has a relatively limited acceptance bandwidth, i.e. the width of the wavelength band around a nominal wavelength of the radiation which can be doubled in frequency by the non-linear optical material. Moreover, both the wavelength of the diode laser and the acceptance bandwidth of non-linear optical materials are very much dependent on temperatures, so that they vary readily with respect to each other and no frequency-doubled radiation will emerge from the waveguide.

A first way of generating a stable beam of frequency-doubled radiation is to provide the wall of the second holder 27 with a small aperture via which the assembly substrate 14 of the waveguide 13 can be changed in temperature.

A second and simpler way to achieve this object is high-frequency pulsing of the diode laser. This will give the spectrum a wide band, which spectrum includes a suitable wavelength within the acceptance bandwidth.

Since not all fundamental radiation is doubled in frequency, a radiation source unit as described above will generally also emit a small quantity of fundamental radiation. To prevent this, a wavelength-selective element 37 which only passes the frequency-doubled light and blocks the fundamental radiation is preferably arranged at the end of the second holder 27 where the frequency-doubled radiation leaves the radiation source unit. Such an element 37 may be, for example an optical filter of the type BG18 or a multilayer interference filter.

Figure 2:
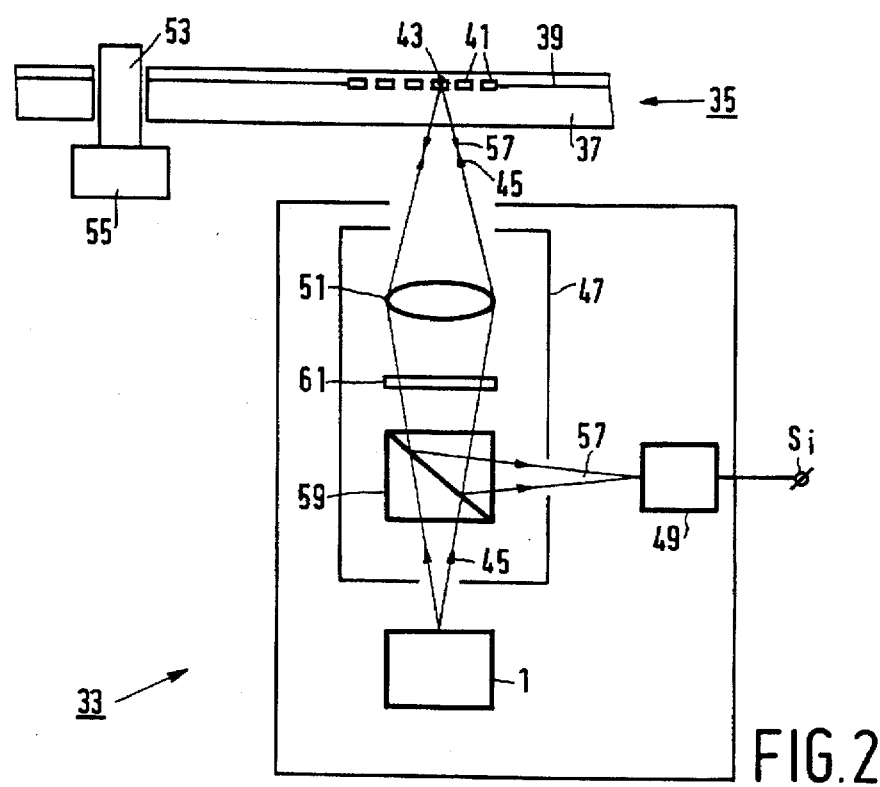
FIG. 2 is a diagrammatic representation of a write/read apparatus provided with a radiation source unit according to the invention.

FIG. 2 is a diagrammatic representation of an embodiment of a device for optically scanning an optical record carrier. Scanning is understood to mean scanning during writing and scanning during reading of a record carrier. Such a device is known, for example from the article "Het systeem "Compact Disc Digital Audio" by M. G. Carasso et al. in Philips Technisch Tijdschrift 40, 267–272, 1981/82, no. 9.

The record carrier 35 shown partly in a radial cross-section is constituted by a transparent substrate 37 and a reflecting information layer 39. This layer 39 comprises a large number of information areas (not shown) which are optically distinguished from their surroundings. The information areas are arranged in a large number of tracks 41, for example quasi-concentric tracks together forming a spiral track. These tracks 41 are scanned by means of a scanning spot 43. The device 33 comprises a radiation source unit 1 according to the invention which supplies a radiation beam 45, an optical system 47 for focusing this radiation beam 45 to a scanning spot 43 on the record carrier 35, and a radiation-sensitive detection system 49 for converting the reflected radiation from the record carrier 35 into an electric signal $S_i$. The beam 45 emitted by the radiation source unit 1 is focused by an objective system 51, represented by a single lens for the sake of simplicity, to a scanning spot 43 in the information plane, which plane reflects the beam 45. By rotating the record carrier 35 by means of a shaft 53 driven by a motor 55, an information track is scanned.

During scanning the reflected beam 57 is intensity-modulated in accordance with the information stored in the succession of information areas. To distinguish the reflected beam 57 from the projected beam 45, use may be made of, for example a polarization-sensitive beam splitter 59 in combination with a λ/4 plate 61, as is shown in FIG. 2. It is then ensured that the laser beam 45 has such a direction of polarization that this beam is completely passed by the beam splitter 59. On its way to the record carrier 43, this beam traverses the λ/4 plate 61 a first time and after reflection by the carrier 43 it traverses the λ/4 plate a second time so that its direction of polarization is rotated 90° before it enters the beam splitter 59 again. Consequently, the beam 57 is completely reflected towards the detection system 49.

By using a radiation source unit according to the invention in a scanning device, a scanning device is obtained with a scanning beam which is relatively stable in intensity and with which a record carrier having a high information density can be scanned.

Figure 3:
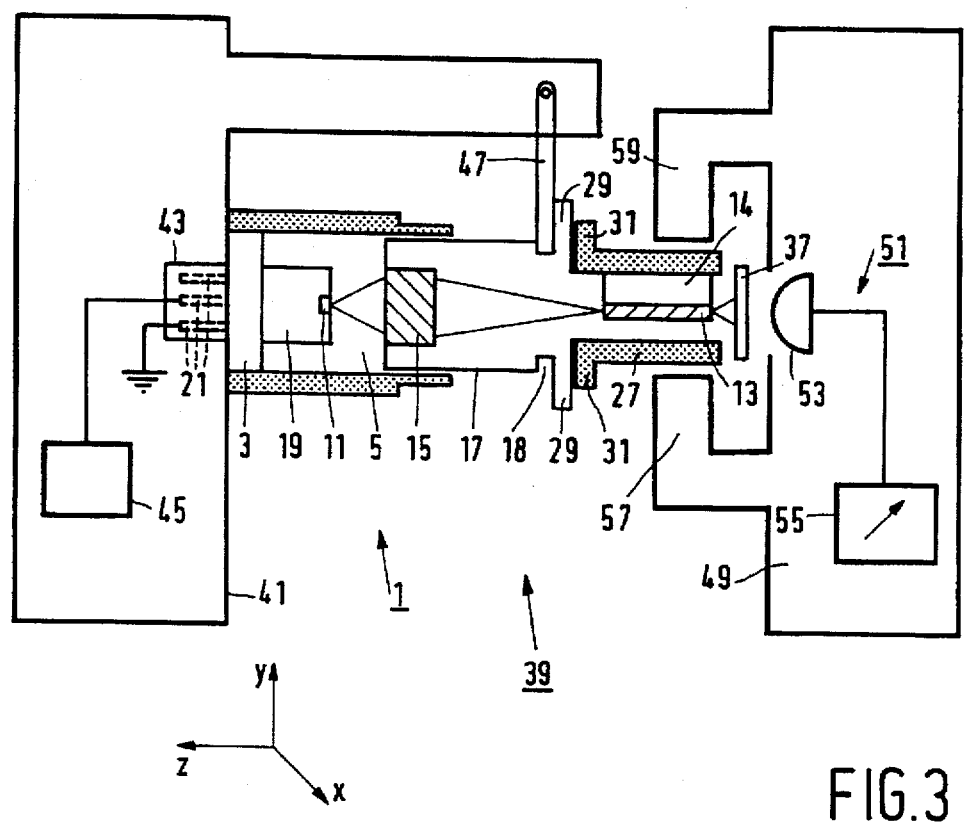
FIG. 3 is a diagrammatic representation of an assembly device for assembling a radiation source unit according to the invention.

FIG. 3 is a diagrammatic representation of an assembly device 39 suitable for assembling a radiation source unit 1 according to the invention. The assembly device 39 comprises a first part 41 in which the bush 5 with the support 3 for the diode laser 11 is retained and which incorporates a contact element 43 via which the diode laser is connected to a diode laser power supply 45. A clamping spring 47 fitting in the recesses 18 of the first holder 17 is secured to the part 45, ensuring that the first holder 17 springs back when it is urged too far towards the diode laser 11 by the second holder 27. Since the alignment is effected by displacing the second holder 27, this holder 27 is arranged in a second, movable part 49 of the assembly device 39. The second holder 27 is retained by two arms 57, 59. The second part 49 can be displaced both in the z direction so as to ensure that the laser beam is focused on the entrance plane of the waveguide 13, and in the x, y direction so as to ensure that the focus of the laser beam coincides with the entrance aperture of the waveguide 13. The displacement of the second part 49 is thus transferred to the second holder 27. Moreover, the second part 49 comprises a detection system 51 with a detector 53 which is connected to an intensity meter 55 for measuring the intensity of the frequency-doubled radiation, which can be read during alignment. The components are not glued together until the measured intensity is maximum.

We claim:

1. A method of assembling a radiation source unit for supplying short-wave optical radiation; comprising the steps of:

positioning a diode laser within one end of a cylindrical bushing;

positioning a first holder within the opposite end of the cylindrical bushing, said first holder supporting a lens system;

positioning a second holder adjoining an end of the first holder remote from the diode laser, the second holder supporting therein a thin film waveguide of non-linear optical material;

actuating the diode laser to produce a beam of laser radiation, and moving the first holder by means of the second holder in a direction parallel to the direction of propagation of the laser beam so as to focus the laser beam on an entrance plane of the waveguide;

moving the second holder independently of the first holder in two mutually perpendicular directions with respect to said direction of propagation, so as to optimally position the focused laser beam in the entrance aperture of the waveguide;

fixing together the cylindrical bushing and the first holder;

moving the second holder independently of the first holder for a second time in said two mutually perpendicular directions so as to secure alignment of the chief ray of the laser beam, the optical axis of the lens system, and the axis of the waveguide; and fixing together the first holder and the second holder.

2. A method as claimed in claim 1, wherein optimal positioning of the laser beam in the entrance aperture of the waveguide is determined based on detection of the intensity of frequency-doubled radiation from the waveguide in relation to the intensity of the laser beam.

* * * * *